Patented May 8, 1923.

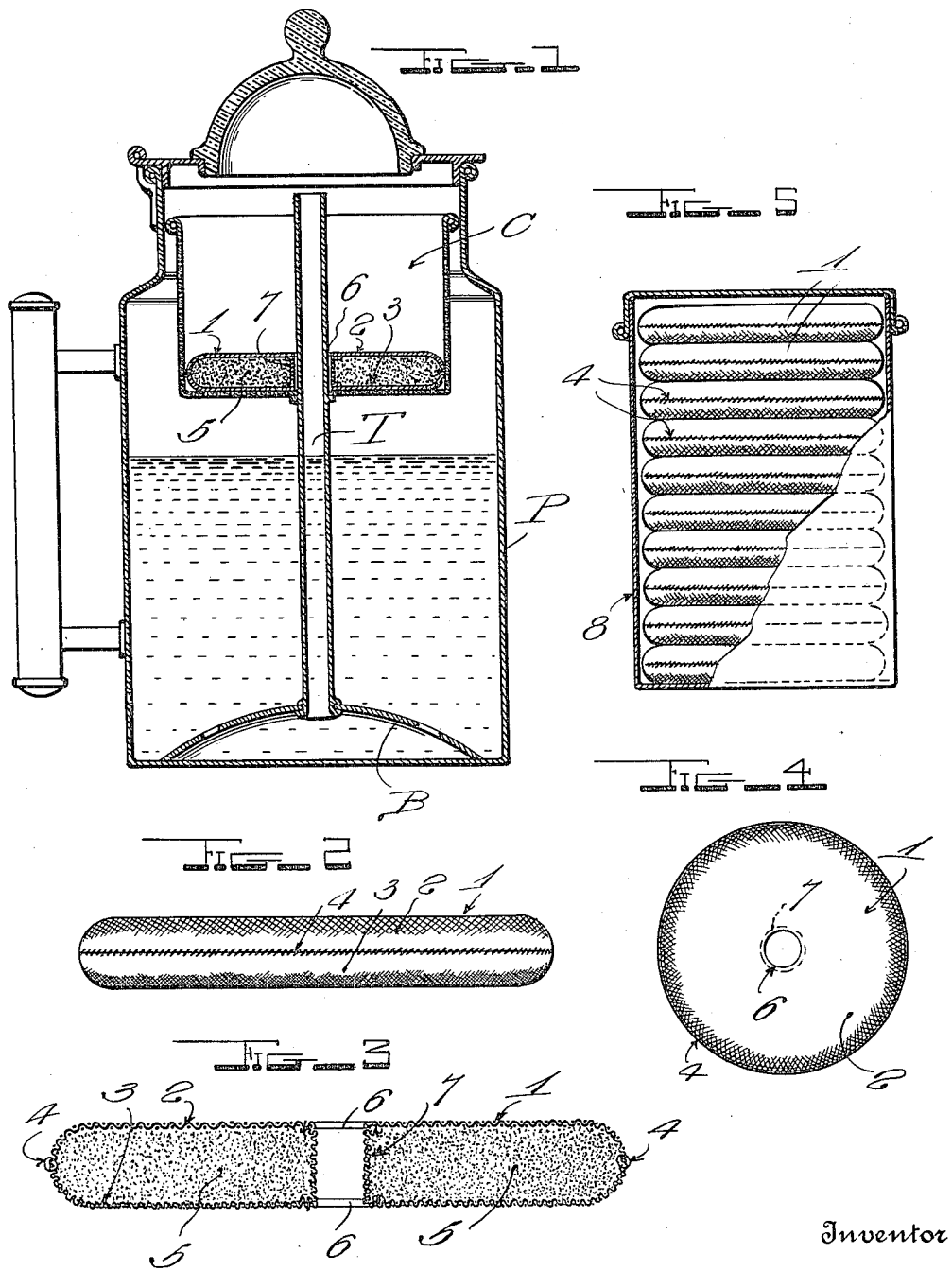

1,454,739

UNITED STATES PATENT OFFICE.

CLIFTON BENNET HOLLAND, OF NASHVILLE, TENNESSEE.

COFFEE CARTRIDGE.

Application filed June 1, 1922. Serial No. 565,089.

*To all whom it may concern:*

Be it known that I, CLIFTON BENNET HOLLAND, a citizen of the United States, residing at Nashville, in the county of Davidson and State of Tennessee, have invented certain new and useful Improvements in a Coffee Cartridge, of which the following is a specification, reference being had therein to the accompanying drawing.

This invention relates to an improved coffee cartridge, that is to a container for coffee, tea or the like which is especially constructed to be placed within the pot to permit the making of a highly desirable beverage.

The unique cartridge is designed especially to be used in connection with conventional percolators and it has for one of its main objects to provide a cartridge which is filled with a predetermined quantity of coffee accurately measured and weighed for the purpose of making a given number of cups according to the size of the cartridge.

More specifically speaking, it is another object of the invention to provide a substantially flat and annular cartridge constructed from suitable fabric material, the cartridge being of a diameter to permit it to be placed in the usual perforate cup of the percolator and being intended to surround the hot water tube so that the overflowing hot water will effectively penetrate and percolate downwardly through the cartridge without carrying the grounds and sediment with it to collect in the bottom of the pot.

Another object of the invention is to provide an extremely simple and inexpensive coffee cartridge which is absolutely sanitary, one which is properly sized and shaped to accurately fit within a conventional type of percolator cup, one which contains the exact amount of coffee necessary to make a predetermined number of cups of wholesome coffee, and one in which the passage of the fluid downwardly through it is retarded to insure thorough and effective extracting of the flavor and strength from the finely ground coffee in the cartridge.

Other objects and advantages of the invention will be apparent during the course of the following description.

In the accompanying drawings forming a part of this specification and in which like numerals are employed to designate like parts throughout the same:

Figure 1 is a central vertical section through a conventional type of coffee percolator and pot showing one of the coffee cartridges arranged in the perforate cup of the percolator.

Figure 2 is a side elevation of the cartridge.

Figure 3 is a central section through the cartridge showing the construction more clearly.

Figure 4 is a top plan view of the cartridge.

Figure 5 is a view with parts broken away and shown in section illustrating a number of the cartridges packed in a can.

In the drawings, the letter P represents a conventional type of coffee pot in which the usual percolator is arranged. As is well known, this percolator embodies a false bottom B from which the water elevating tube T rises, this tube extending through the perforated cup C in which the coffee is placed to permit the overflowing hot water to trickle downwardly through it.

Although it is not essential, I have especially designed my improved cartridge 1 to be used in connection with the type of percolator above described. To permit it to be arranged in the perforate cup C, the cartridge is preferably substantially circular in shape and to permit convenient packing in cans for sale or to permit two or more of the cartridges to be arranged in the perforate cup of the percolator, the cartridges are preferably flat. Although the cartridges could be constructed from some other material or formed in other ways, each one is preferably made from two substantially circular pieces of fabric 2 and 3 respectively. The top piece 2 is coarse while the bottom piece 3 is fine. In constructing the cartridge, the edges of the material are stitched together as indicated at 4 and as is understood, the coffee 5 is placed between the pieces of material. To permit the cartridge to be placed in the aforesaid cup of the percolator, both pieces of material are formed with central alined openings 6 and as better seen in Figure 3, the edges of these openings are stitched to a vertical fabric sleeve 7 which has its upper ends turned laterally to permit effective stitching of the pieces 2 and 3 thereto.

It may be conveniently mentioned here, as before inferred, that in practice, the cartridges will be arranged in superposed relation and packed in an air-tight shipping can 8 as seen more clearly in Figure 5. When packing the cartridges at the factory, the quantity of coffee placed in each will be accurately measured, so that each cartridge can be properly used for making a predetermined number of cups of good wholesome coffee which is neither too strong nor too weak. By scientifically measuring and filling the cartridges with very finely ground coffee, wastage of the latter will be entirely eliminated and even inexperienced hands will be able to make a good cup of coffee. I contemplate indicating on the label on the can 8, just how many cups of coffee each cartridge will make. Of course, the cartridges will be of different sizes to suit the market demands.

In use, one or more cartridges placed in the perforated cup C of the percolator, the number of cartridges used being governed by the quantity of beverage desired. Each cartridge is uniform in thickness and the material used for forming the casing is preferably such as to maintain the cartridge in its orginal shape as long as possible to permit the overflowing hot water from the elevating tube T to be uniformly distributed over the top of the cartridge to circulate downwardly through the granular coffee therein. Attention is here directed to the fact that the coarse upper piece of material 2 of the cartridge will facilitate the passage of the hot water therethrough. However, to insure that the strength and flavor will be effectively extracted from the coffee in the cartridge, it is desired to retard the discharge of the water from the cartridge and for this reason the lower or bottom piece of material of the cartridge is considerably finer.

From the foregoing description, it is evident that I have evolved and produced an extremely unique coffee cartridge which is highly desirable for household use, due to the fact that it insures the making of a good wholesome cup of coffee. A cartridge of the type is also particularly advantageous in that it affords the use of a very finely ground or pulverized coffee. By using such fine coffee, the passage of the hot water therethrough is facilitated and the desirable flavor and strength is thoroughly extracted from the coffee. Furthermore, by forming the container from pieces of comparatively finely woven fabric, very little grounds and sediment will be permitted to deposit in the bottom of the pot as is usual. Neither will the liquid coffee or beverage be filled with dregs as is frequently the case. By eliminating the collection of sediment in the pot, the latter is prevented from being badly stained, and it has been found from actual practice, that rinsing the pot with hot water will suffice to maintain it in a sanitary and desirable condition at all times. In view of the foregoing, frequent scouring and scraping of the pot and parts of the percolator is usually unnecessary.

By carefully considering the description in connection with the drawings, persons familiar with devices of this class will doubtless be able to obtain a clear understanding of the invention. Therefore, a more lengthy and detailed description is deemed unnecessary.

Since probably the best results may be obtained with the construction and arrangement herein shown and described, this is taken as the preferred embodiment of the invention. However, it is to be understood that minor changes coming within the scope of the invention as claimed may be resorted to if desired.

I claim:—

1. A beverage cartridge in the form of an annular reticular container intended to be placed in and to surround the fluid tube in perforated cup of a percolator.

2. The combination with a coffee percolator including the usual perforate cup and fluid tube extending therethrough, of a substantially flat annular cartridge filled with coffee and arranged in the cup and surrounding the tube, said cartridge being made from reticular material to permit circulation of the hot water therethrough.

3. A coffee cartridge in the form of an annular substantially flat container formed from upper and lower pieces of coarse and fine fabric respectively, said pieces being stitched or otherwise connected together.

4. A cartridge filled with coffee or the like in the form of a substantially flat circular container, said container being composed of two pieces of fabric material stitched together around their outer edges, said pieces being formed at their centers with aligned openings, a sleeve arranged between the pieces of material and connected thereto adjacent said openings, said sleeve being aligned with said openings to permit passage therethrough of the water-elevating tube of the percolator, said pieces of material forming the container being of coarse and fine material respectively for the purpose described.

In testimony whereof I hereunto affix my signature.

CLIFTON BENNET HOLLAND.